(12) United States Patent
Butt

(10) Patent No.: US 11,957,112 B2
(45) Date of Patent: Apr. 16, 2024

(54) HAY NET

(71) Applicant: Jane Butt, Leeds (GB)

(72) Inventor: Jane Butt, Leeds (GB)

( * ) Notice: Subject to any disclaimer, the term of this patent is extended or adjusted under 35 U.S.C. 154(b) by 147 days.

(21) Appl. No.: 16/883,991

(22) Filed: May 26, 2020

(65) Prior Publication Data

US 2020/0296922 A1    Sep. 24, 2020

Related U.S. Application Data

(62) Division of application No. 13/603,516, filed on Sep. 5, 2012, now abandoned.

(30) Foreign Application Priority Data

Sep. 7, 2011 (GB) .................................. 1115470
Dec. 19, 2011 (GB) .................................. 1121809

(51) Int. Cl.
*A01K 5/00* (2006.01)
(52) U.S. Cl.
CPC .................................... *A01K 5/008* (2013.01)
(58) Field of Classification Search
CPC ................................ A01K 5/008; A45C 3/045
See application file for complete search history.

(56) References Cited

U.S. PATENT DOCUMENTS

| | | | | |
|---|---|---|---|---|
| 432,006 A * | 7/1890 | Williams | ............. | A01K 5/008 119/65 |
| 1,737,065 A * | 11/1929 | Galbraith | ............. | B65D 29/04 383/26 |
| 2,510,186 A * | 6/1950 | Marsico | ............. | A45C 3/045 224/601 |
| 2,552,443 A * | 5/1951 | Molinari | ............. | A45C 3/045 224/601 |
| 3,483,907 A * | 12/1969 | Corridon | ............. | A45C 3/045 383/76 |
| 4,979,833 A * | 12/1990 | Cook | ............. | A45C 3/00 383/109 |
| 5,050,999 A * | 9/1991 | Van Loon, III | ............. | A45C 3/045 383/76 |
| 5,098,754 A * | 3/1992 | Horstmyer | ............. | A01F 25/14 428/35.2 |
| 5,118,201 A * | 6/1992 | Cook | ............. | A45C 3/00 383/12 |

(Continued)

FOREIGN PATENT DOCUMENTS

WO    WO-2010043912 A1 *    4/2010    ............. B65D 33/28

*Primary Examiner* — Michael H Wang
(74) *Attorney, Agent, or Firm* — James Marc Leas

(57) ABSTRACT

Example hay nets for providing hay to horses are disclosed. A disclosed example hay net includes a mesh body forming a bag, having a securing member at a first position relative to the body of the net, a mouth formed at a second position relative to the body of the net, the first position being spaced from the second position, and a strap engaging the net adjacent the first position to secure the strap relative to the body of the net adjacent the first position, and engaging the net adjacent the second position to secure the strap relative to the body of the net adjacent the second position, wherein the length of the strap between the first and second positions is variable whilst maintaining engagement between the strap and the net adjacent both the first and second positions.

23 Claims, 4 Drawing Sheets

(56) References Cited

U.S. PATENT DOCUMENTS

| | | | | | |
|---|---|---|---|---|---|
| 5,203,281 | A | * | 4/1993 | Harwich | A01K 5/01 119/57.9 |
| D369,467 | S | * | 5/1996 | Cole | D3/300 |
| 5,845,994 | A | * | 12/1998 | Rice | A45C 1/04 383/76 |
| 5,909,833 | A | * | 6/1999 | Smith | A45F 3/02 224/577 |
| D449,905 | S | * | 10/2001 | Laurence | A45C 3/00 D30/121 |
| 6,305,876 | B1 | * | 10/2001 | Yoshino | E02B 17/0017 405/17 |
| 6,398,410 | B1 | * | 6/2002 | Guerra | D06F 95/006 383/117 |
| D504,014 | S | * | 4/2005 | Lampley | D3/221 |
| 6,902,338 | B2 | * | 6/2005 | Puvvada | A47K 7/03 401/201 |
| 7,240,517 | B2 | * | 7/2007 | Barak | A44C 17/0283 206/6.1 |
| 7,815,372 | B2 | * | 10/2010 | Stanton | B65F 1/1415 383/104 |
| D658,337 | S | * | 4/2012 | Crossing | A45F 3/02 D30/121 |
| D684,732 | S | * | 6/2013 | Warren | D30/121 |
| 8,677,940 | B1 | * | 3/2014 | Anderson | A01K 5/008 119/65 |
| 2010/0257701 | A1 | * | 10/2010 | Gammell | A43C 1/06 24/115 G |
| 2013/0112148 | A1 | * | 5/2013 | Warren | A01K 5/008 119/65 |
| 2015/0122188 | A1 | * | 5/2015 | Webster | A01K 1/10 119/65 |
| 2016/0050883 | A1 | * | 2/2016 | Davis | A01K 1/10 119/60 |

* cited by examiner

HAY NET

CROSS-REFERENCES TO RELATED APPLICATIONS

This application claims priority to United Kingdom Patent Application No. GB1115470.5, filed 7 Sep. 2011 and United Kingdom Patent Application No. GB1121809.6, filed 19 Dec. 2011 which are incorporated by reference herein without disclaimer.

FIELD OF THE DISCLOSURE

The present disclosure relates to a hay net, and in particular but not exclusively, to a feeding net for providing hay to horses.

BACKGROUND

Horses are typically fed hay (dried grass) as a large proportion of their diet, or in some cases, their entire diet. To keep their digestive systems functioning correctly, horses naturally graze constantly throughout the day, and, as such, some horses have a tendency to become unsettled or stressed if they do not have a constant supply of food to graze on. Moreover, if their food supply is intermittent, the horse may overeat whenever the food supply is replenished, and this may have an adverse effect on the horse's health.

There are three main ways in which hay is given to a horse—loose on the ground, in a manger fixed to an inside stable wall or in a hay net.

Where hay is provided on the ground, it can become mixed with mud and droppings, which may result in a significant proportion of the hay being wasted, as a horse will not eat soiled feed. The loose hay can also be trampled over a large area, creating a large amount of mess which must be cleared up.

Whilst use of a manger is advantageous as it contains the hay and keeps the majority of the hay from being soiled, mangers tend to be fixed in one place. In contrast, a hay net can be used in a variety of locations—in a stable, field or horse box, and can readily be moved with the horse. The hay net is typically suspended from a fixture on a wall or a fence. This allows a horse to pull hay through the apertures in the net, whilst keeping the hay in a fixed location and reducing the amount of hay coming into contact with the ground.

However, there are a number of problems associated with the use of hay nets. Once a net is loaded with hay, it may be very heavy and therefore hard to lift up in order to hang it above the ground. To prevent a horse from becoming tangled with a net, particularly once the net has been emptied, it is preferable to hang the net a significant distance above ground level. Furthermore, a net full of hay generally forms a rounded volume which can be awkward to carry, and difficult to lift off the ground to a position where it can be supported comfortably.

Another drawback of a standard hay net is that a rope or cord is used to tie the net to a support structure. This involves a user having to lift the net up into place, pull the rope down to the base of the net, feed it through the base of the net and then pull it back up as high as possible before tying a knot to hold the net in place. The knot needs to hold the net in place without tightening so much that it is impossible to untie one the net is empty. A quick release knot is therefore usually used. This can, however, come undone as the horse tugs on the net during feeding. It is also common for horses, particularly young horses, to pull at the net, and to play with it once it is empty. Such activity may also cause the knot to become untied. If this happens, the net may remain attached its support but hang down close to the ground, or it may come off the support and fall to the ground. Either way, the forelimbs of the horse may become entangled in the empty net, and this may result in serious injury being caused to the horse. The risk is particularly serious if the net is still attached to the support at the time.

The present disclosure seeks to reduce or overcome one or more of the above problems.

SUMMARY

According to a first embodiment we provide a hay net, the net comprising a mesh body forming a bag, having a securing member at a first position relative to the body of the net, a mouth formed at a second position relative to the body of the net, the first position being spaced from the second position, and a strap engaging the net adjacent the first position to secure the strap relative to the body of the net adjacent the first position, and engaging the net adjacent the second position to secure the strap relative to the body of the net adjacent the second position, wherein the length of the strap between the first and second positions is variable whilst maintaining engagement between the strap and the net adjacent both the first and second positions.

The strap may be an elasticated strap.

The strap may be releasably secured relative to the body of the net adjacent the first and second positions.

The strap may include a fastening element for closing the mouth of the net.

The strap may comprise the fastening element.

The hay net may further include a guide formation disposed around at least a portion of the mouth for receiving the fastening element.

The guide formation may comprise a plurality of loops.

The securing member may comprise a ring.

A first attachment arrangement may be provided towards a first end of the strap.

A second attachment arrangement may be provided towards a second end of the strap, the second attachment arrangement being a clip engageable with at least one of the first attachment arrangement and the securing member.

One or both of the first and second attachment arrangements may be at least one of a clip or a loop suitable for securing to a clip.

The first attachment arrangement may be securable to the second attachment arrangement.

The hay net may include a further securing member disposed adjacent the second position.

The hay net may further comprise a guide formation disposed around at least a portion of the mouth for receiving a fastening element for closing the mouth of the net, the strap being releasably secured to the securing member towards a first end, a second end which engages with the guide formation, and a toggle which is mounted on two portions of the strap extending from the guide formation, the toggle engaging with the two portions of the strap on which it is mounted substantially to prevent movement of the strap relative to the toggle, and being manually operable out of locking engagement with the said portions of the strap to permit movement of the strap relative to the toggle.

The guide formation may comprise a plurality of loops.

The toggle may comprise a body, a clamping member which is movable relative to the body, and a resilient biasing element which urges the clamping member to clamp the strap between it and the body, and thereby substantially prevent movement of the strap relative to the toggle.

The resilient biasing element may comprise a spring.

BRIEF DESCRIPTION OF THE DRAWINGS

Embodiments will now be described, by way of example only, with reference to the following figures, of which.

DETAILED DESCRIPTION

Figure 1:
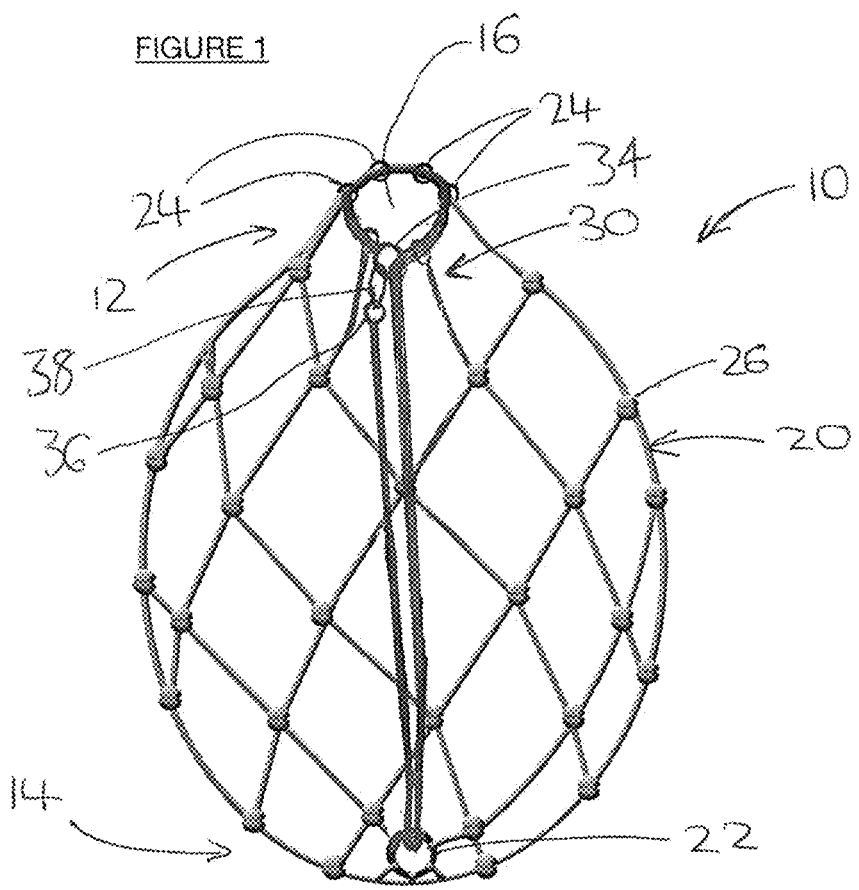
FIG. 1 shows a net according to an embodiment.
Figure 2:
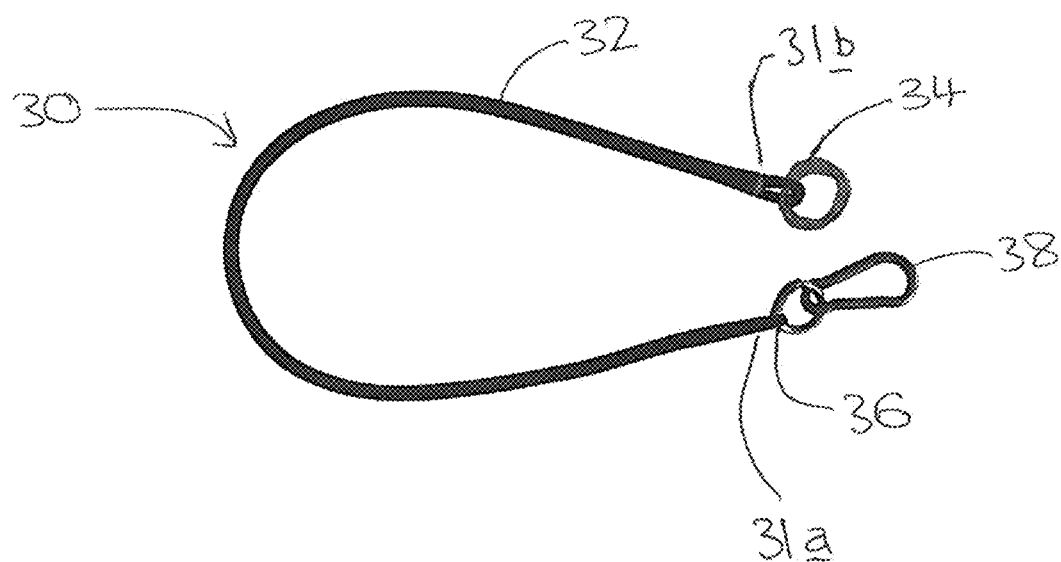
FIG. 2 shows the strap of the net of FIG. 1.

With reference to FIGS. 1 and 2 of the drawings, a net 10 is provided, the net being formed in a standard manner from a plurality of strands that are tied or knotted to one another to form a meshed bag. Whilst in this example the strands shall be referred to as rope strands, it should be understood that alternative materials such as twine or cord may be used, or any other material suitable for net-making, as is known in the art. At a first position 14 relative to the net 10 multiple strands are tied or otherwise secured relative to one another, to form a 'closed end' of the bag. A securing member 22 is provided at the first end 14, to which strands may be secured. The securing member 22 may be a ring made of steel.

At a second position on the net 12, spaced from the first position 14, an opening is formed 16 defining a mouth 16 of the bag. A continuous mesh wall 20 of the net is formed between the mouth 16 and the closed first end 14, the wall 20 defining a volume for receiving hay or the like. The mouth 16 of the net may comprise a strand of rope around its circumference, to which strands of the wall of the net are secured, or may comprise lengths of a plurality of strands that are knotted together around the opening.

The bag formed by the net may be oriented so that the first position 14 defines the 'bottom' of the bag, and the second position 12 defines the 'top', as shown in FIG. 1.

The strands of the net may be secured (typically knotted 26) to one another in a regular pattern such that the apertures defined therebetween form squares, rectangles or triangles (but are in no way limited to those shapes).

A guide formation 24 may be provided adjacent the mouth of the net 16. In the example shown in FIG. 1, the guide formation comprises a plurality of loops 24 (and shall hereinafter be referred to as loops) formed from strands of rope, or any other suitable material, at positions spaced around the circumference of the mouth 16. The loops are suitable for receiving a fastening element, which may be threaded through the loops to form a draw-string around the mouth of the net. The fastening element comprises a length of elasticated material, or alternatively a length of rope, cord, twine, or any other suitable material.

In a first embodiment, shown in FIG. 1, the net includes a strap 30 which comprises a length of elasticated material 32 which forms the fastening element. By drawing the fastening element through the loops 24 and tightening it so as to draw the loops 24 towards one another, the mouth of the bag may be closed and held in a closed formation.

The term 'closed', in this instance, is not intended to mean that the net is sealed, but that it is closed to the extent that the net walls 20 at the second position 12 are brought sufficiently close to one another to prevent large quantities of hay held within the net falling out of the net through the mouth 16. Optionally, the ends of the fastening element may then be knotted together, to fasten the mouth 16 in its closed formation.

In use, a quantity of hay may be placed inside the net, through the open mouth of the net, so that it is held within the net. Hay is commonly provided in bales, part-bales, or slices of a bale (referred to in the art as 'flakes'), which give it a compact form. While it is possible for small clumps or strands of the hay to be pulled or to fall through the apertures of the net, the compact form of the hay means that, in general, strands tend not to fall through the apertures in the mesh walls of the net unless they are pulled through the apertures (by a horse feeding, for example).

In use, the net may be supported on a support structure, such as a hook or a ring positioned on a wall, post or fence, so that the net is held above ground level. A horse may then feed from the net by pulling strands or clumps of hay from within the net, through the apertures in the walls of the net, using its teeth.

To support the net on a support structure, a strap 30 is provided. The strap comprises a body 32 formed of a length of elasticated material, having a first 31a and a second 31b end. First and second attachment arrangements 38, 34 are provided at first 31a and second 31b ends of the body of the strap, respectively. In the example shown, the strap is provided with a first ring 36 at its first end 31a, and a second ring 34 at its second end 31b. A karabiner clip 38 is attached to the first ring 36, to allow the first end 31a to be fastened to the securing member 22 at the first position 14 on the net.

To attach the strap 30 to the body of the net, the strap may be secured to the guide formation at the mouth 16 of the net and the securing member 22 at the bottom of the net.

In the embodiment shown in FIG. 1, where the guide formation comprises a plurality of loops 24, the second end 31b of the strap passes through each of the loops 24 around the mouth 16 of the net, forming the fastening element for closing the mouth of the bag. Rather than a knot being tied in the fastening element, to hold the mouth 16 closed, the strap 30 passes through the second ring 34 at the second end 31b of the strap 30. The strap 30 passes down to the bottom of the net 12, where it passes through the securing member 22 before returning to the mouth 16 of the net, where the clip 38 is clipped onto the second ring 34 at the mouth 16 of the net.

The elasticated body 32 of the strap 30 allows the strap to stretch, so that the strap 30 extends between the mouth 16 and the securing member 22.

Tension in the body 32 of the strap 30 causes the strap 30 to remain tight, thus holding the mouth 16 of the net in its closed formation whilst the second end 31b of the strap is held relative to the first end 31a of the strap, as shown in FIG. 1 of the drawings.

Whilst in this example, the clip 38 is secured to the strap 30 via ring 36, in another embodiment, the clip 38 may be attached directly to the body 32 of the strap 30, by way of a further loop, rather than by attachment to a ring 36. It is contemplated that the attachment arrangements may comprises any combination of hooks, loops, clips, and the like.

Whilst in the example illustrated in FIG. 1, the clip 38 is secured to the ring 34 at the mouth of the net it could equally be secured to the securing member (ring 22) at the base of the net.

Figure 4:
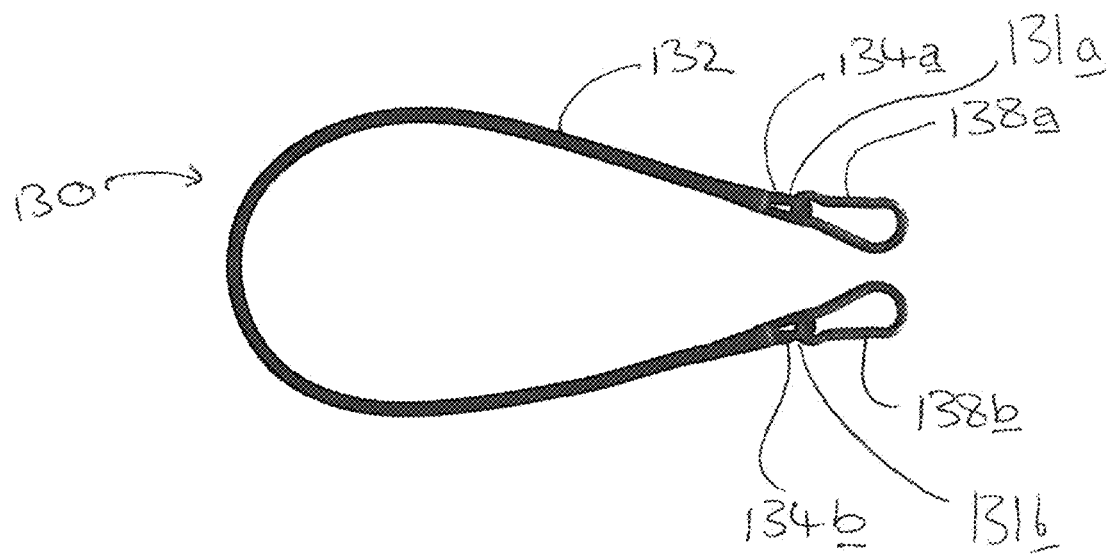
FIG. 4 shows the strap suitable for use with the net of FIG. 3.

In the example given, the strap 30 is provided with the ring 34 at its second end 31*b*, but it should be understood that alternative attachment arrangements may be provided. For example, the ring may be replaced by a loop formed by the strap 30 itself. This would, for example, enable a user to secure the strap 30 to a net where the loops 24 forming the securing member are too small for a ring to pass through. Alternatively, the ring may be replaced by a further clip 138*b*, as illustrated in FIG. 4. In the embodiment of strap 130 shown in FIG. 4, the two clips 138*a*, 138*b* are each secured to a loop 134*a*, 134*b* at either end of the strap 130. It will be appreciated, however, that one or both clips 138*a*, 138*b* could be secured to a ring at the end of the strap.

By virtue of the use of two clips 138*a*, 138*b*, the second clip 138*b* may be secured to the second end 131*b* of the strap 130 after the strap 130 has been threaded through the loops 24. In other words the further clip 138*b* could be removed before threading the second end 31*b* of the strap 30 through the guide formation (in this example the loops 24) and then replaced at the second end 31*b* of the strap when the strap is fully engaged with the guide formations. Similarly, the first clip 138*a* may be secured to the first end 131*a* of the strap 130 after the first end 131*a* of the strap has been passed through the securing member 22.

The hay net 12 may be used as follows.

Advantageously, the second end 31*b* of the strap 30 is attached to the guide formation 24 before the net 12 is filled. After the net is filled, the mouth 16 of the net 12 may then be closed by threading the first end 31*a* of the strap through the second ring 34. The first end 31*a* of the strap is then drawn down towards the bottom of the net 12, and the clip 38 passed through the securing member 22 at the bottom of the net 12. The first end 31*a* of the strap 30 is then pulled back to the mouth 16 of the net 12 where it is clipped to the second ring 34. Alternatively, the clip 38 may be clipped to the securing member 22.

To support the net 10 relative to a support structure, where the support structure is provided with a hanging loop or ring, or a bar, for supporting the net 12, the first end 31*a* of the strap 30 may be passed through the hanging loop or around the bar either before being passed through or clipped to the securing member 22 or after being passed through the securing member 22 but before being clipped to the second ring 34, or, more preferably, both.

The hay net 12 could, of course be hung from a hook simply by placing one or both of the portions of the strap 30 between the securing member 22 and the second ring 34 over the hook.

The tension in the body 32 of the strap ensures that the mouth 16 of the net is held in its closed formation, and the net 10 is supported from the support structure by the strap 30. The elasticity in the body 32 of the strap makes it relatively easy to secure the strap 30 relative to the securing member 22 when the net is full of hay, and is heavy, since the strap 30 will stretch under force applied by a user. Therefore, by pulling the strap 30 to extend it, a user can simply attach the clip 38 at the first end 31*a* of the strap to the ring 34 at the second end 31*b* of the strap 30, to secure the net relative to the support structure.

An advantage of using a clip 38 and a ring 34 (or loop) to connect the first 31*a* and second 31*b* ends of the strap is that the clip 38 will not come undone without a user manually unfastening it. Previously, it has been necessary for a user to tie a knot between the rope used to tie up the net and the net itself, in order to support the net relative to a support structure. However, it may be awkward to tie a knot whilst holding the net in position. Furthermore, the knot may not be strong enough to support the net, or the knot may be tied poorly, such that the net will eventually fall to the ground. Use of a clip 38, such as a karabiner clip, overcomes this problem.

It will be apparent that alternative arrangements for attaching the respective ends of the strap 30 to the securing member 22, and to each other, may be used.

Figure 3:
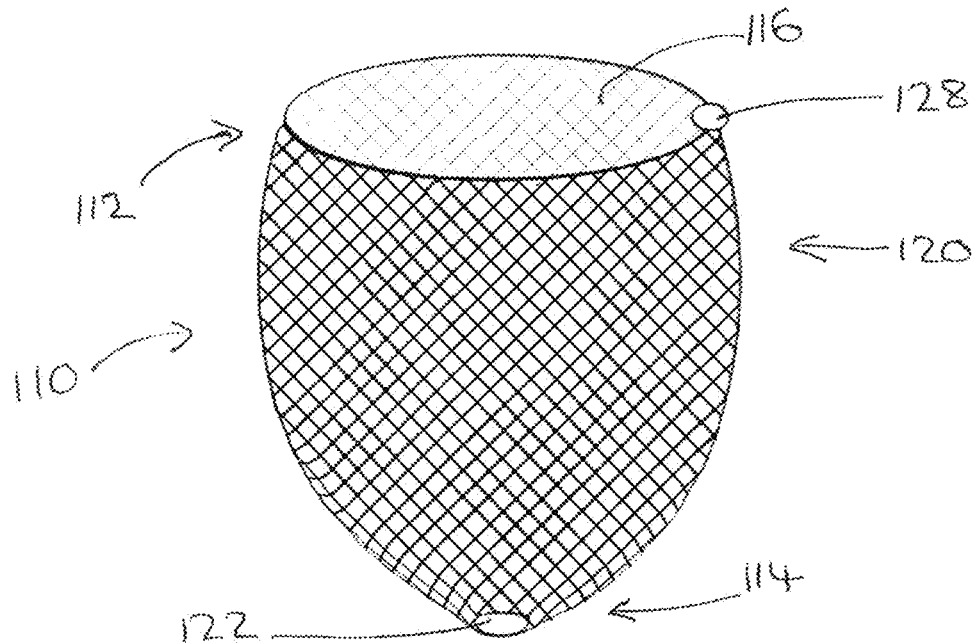
FIG. 3 shows a net according to a second embodiment.

An alternative embodiment of a net 110 is shown in FIG. 3 of the drawings.

The net 110 of FIG. 3 has mesh walls 120 formed of strands, with a first securing member 122 at a first position 114, and a mouth 116 formed at a second position 112. In this embodiment, a second securing member 128 is provided adjacent the mouth 116 of the net 110 at its second position 112. In the example shown, both of the first and second securing members are rings, preferably made of steel.

Figure 5:
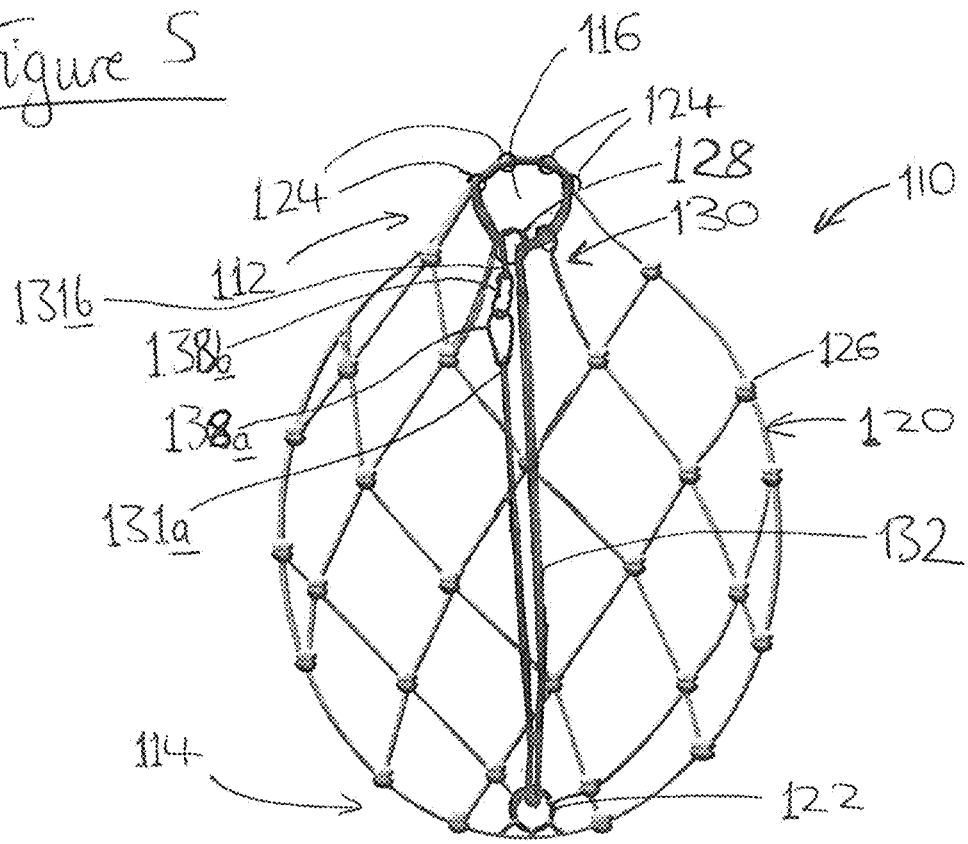
FIG. 5 shows the net of FIG. 3 fitted with the strap of FIG. 4.

In this case, the strap 30, 130 may be used in much the same way as in the first embodiment, but rather than pass the strap 30, 130 through the second ring 34 or clip 138*a* at the second end 31*b*, 131*b* of the strap 30, 130 to close the mouth 116 of the net 112, the strap 30, 130 may pass through the second securing member 128, as illustrated in FIG. 5. Where the version of the strap 130 shown in FIG. 4 is used, the two clips 138*a*, 138*b* may be clipped together (as illustrated in FIG. 5), or one or both may be clipped to the second securing member 128.

The net 112 may be connected to a support structure in a similar way to the net of FIG. 1.

It will be appreciated that the net shown in FIG. 3 could equally be used with a strap with a clip at one end and a loop or ring at the other end. In this case, rather the clip would be connected to the loop or ring rather than to another clip.

In both embodiments, a separate fastening element (not shown), which may be a length of cord or rope, may be used to assist in closing the mouth of the net. The fastening element may then be knotted in order to hold the mouth of the net in its closed formation. In this case, where the strap 30, 130 is used in conjunction with the net 112 shown in FIG. 3, the strap need only engage with the second securing member 128 at the mouth 116 of the net 112—it need not engage with a guide formation to close the mouth 116 of the net 112. Where the strap 130 shown in FIG. 4 is used, one of the clips 138*a* may be clipped to the first securing member 122 and the other of the clips 138*b* may be clipped to the second securing member 128, or both clips 138*a*, 138*b* may be clipped to the same securing member 122, 128, whilst the body 132 of the strap 130 passes through the other securing member 122, 128.

Figure 6:
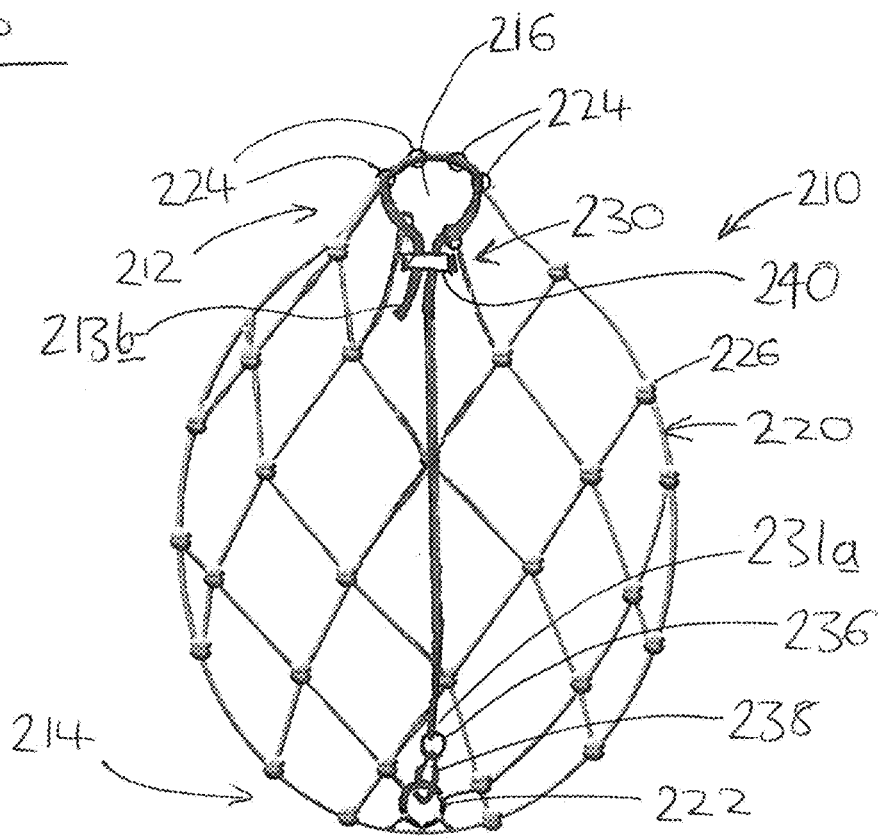
FIG. 6 shows a net according to a third embodiment.

In an alternative embodiment, illustrated in FIG. 6, the strap 230 is preferably made from an inelastic rope or cord, and carries at its first end 231*a* a clip 238 (which may be secured to the strap 230 by a loop or ring 236 as described above in relation to FIGS. 1 to 5) and adjacent its second end 231*b* a toggle 240. By toggle 240 we mean the kind of device which grips one, or more strands of rope or cord on which it is mounted so as to substantially prevent movement of the rope or cord relative to the toggle 240, and which is manually operable to release its grip on the or each strand of rope or cord, thus allowing movement of the rope or cord relative to the toggle 240.

Figure 7:
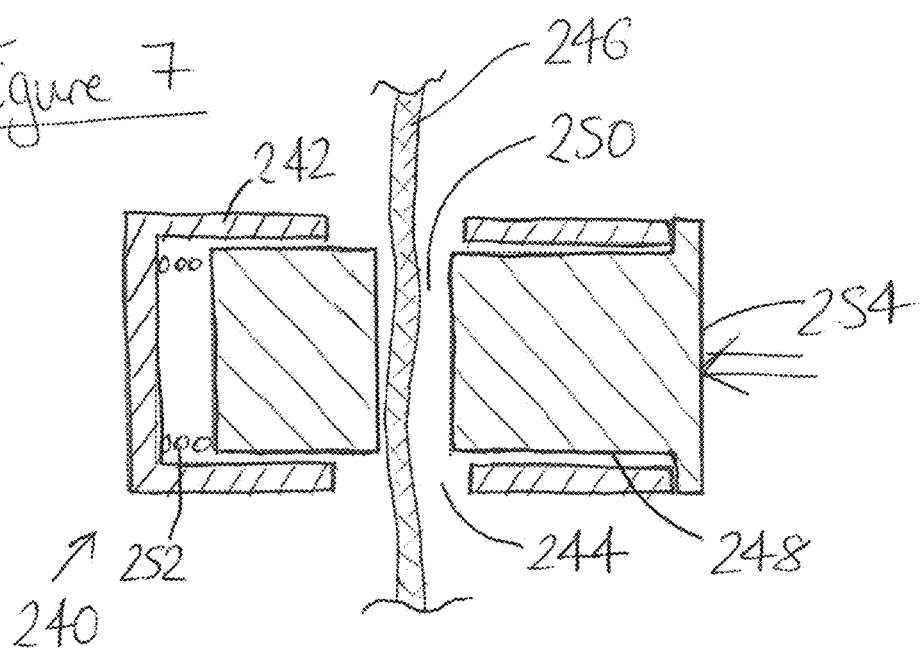
FIG. 7 shows a cross-section through an embodiment of a toggle suitable for use in the third embodiment.
Figure 8:
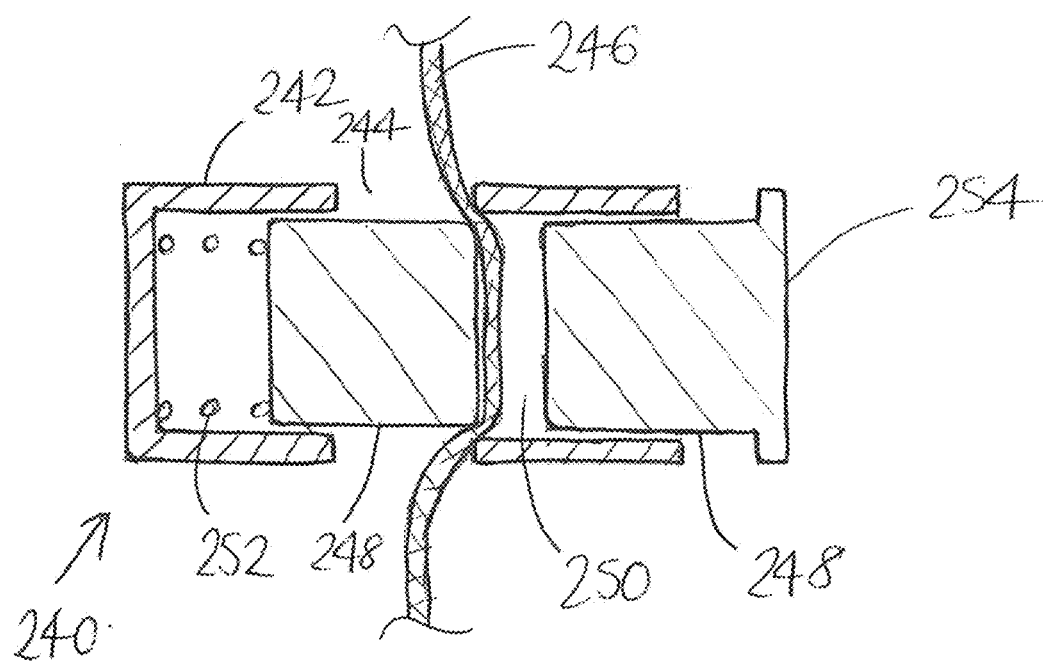
FIG. 8 shows a cross-section through the toggle shown in FIG. 7 in the closed position.

One suitable embodiment of toggle 240 is illustrated in FIGS. 7 and 8. This toggle 240 includes a body 242 with an aperture 244, in use one or more strands of rope or cord 246 passing through this aperture 244. The toggle 240 also includes a clamping member 248 which is located within the body 242, and which has a corresponding aperture 250. There is a resilient biasing member, typically a helical spring 252, which acts between the body 242 and the clamping member 248 to move the two apertures out of alignment with one another as illustrated in FIG. 8. The clamping member also includes an operating part 254 which extends out of the body 242 so that a user may move the clamping member 248 against the biasing force of the spring 252 to bring the two apertures 244, 250 into alignment, as illustrated in FIG. 7.

When the apertures are aligned by a user as in FIG. 7, the toggle may be slid along a strand of rope cord 246 on which the toggle 240 is mounted. When the clamping member 248 is released so that the apertures 244, 250 move out of alignment, as illustrated in FIG. 8, frictional forces between the rope/cord 246 and the body 242 and clamping member 248 prevent movement of the rope/cord 246 relative to the toggle 240 (at least not without applying significant force to the toggle 240 and/or rope/cord 246).

Returning to FIG. 6, just as in the first embodiment, the second end 231b of the strap 230 passes through the guide formation 224 around the mouth 216 of the net 212. The toggle is mounted on both portions of the strap 230 emerging at either end of the guide formation 224 so that the toggle can be operated to release its grip on the strap 230, and the strap pulled through the toggle 240 to substantially close or open the mouth 216 of the net. When the mouth 216 of the net 212 is closed or opened to the desired extent, the toggle may be released to grip the strap and prevent the mouth 216 of the net 212 from opening, or closing, respectively.

After filling the net 212 and using the toggle 240 to close the mouth 216 of the net 212, the clip 238 at the first end 231a of the strap 230 is clipped to the securing member 222 at the base of the net 212. As with the first and second embodiments, the strap 230 may be passed through a hanging loop or ring prior to the clip 238 being clipped onto the securing member 222.

Whilst the strap 230 illustrated in FIG. 6 is a single piece of rope or the like with a first end 231a and a second end 231b, it may comprise a continuous loop or cord or rope with no free ends. In this case, the strap would form a loop which passes through the securing member ring 222, through the toggle 240, around the guide formation (loops 224) through the toggle 240 again and back to the securing member, ring 222.

In further alternative embodiments, the guide formation may comprise one or more sleeves provided around a proportion of the circumference of the mouth. A net of this embodiment may be closed by drawing the strap or a fastening element, such as a length of rope or twine, through the sleeve and tightening the fastening element around the mouth, so as to close the mouth.

It may be desirable to limit the amount of hay that may be pulled through the apertures of a net at once, in order to slow down the rate at which a horse may feed from the net. To achieve this, the mesh walls may be provided with smaller apertures.

The net according to the present disclosure therefore provides a simplified method of connection to a support structure, whilst ensuring that the mouth of the net is held closed. Furthermore, use of a strap as described herein allows a user to carry a quantity of hay, using the net. In the first and second embodiments, the elastic property of the strap allows a user to easily lift the strap so as to position it over a shoulder, to allow the hay to be lifted using the net, so that the net need not be lifted high off the ground. Additionally, a user need not bend low to position the strap over a shoulder, since the strap stretches when pulled by the user.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of an arrangement for performing the disclosed function, or a method or process for attaining the disclosed result, as appropriate, may, separately, or in any combination of such features, be utilised for realising the invention in diverse forms thereof.

What is claimed is:

1. A method of feeding hay to livestock with a hay net device that may be connected to a support structure, comprising:

a. providing a mesh body, wherein said mesh body includes a plurality of strands, a mouth, and a securing member, wherein said mesh body is configured as a bag, wherein said strands are connected to one another with apertures there between, wherein said apertures are sized for retaining the hay in said mesh body while permitting the livestock to remove the hay, wherein said securing member is located at a first position of said mesh body, wherein said mouth is located at a second position of said mesh body, wherein said first position is spaced from said second position, wherein said securing member includes a securing member opening, wherein said mouth includes a plurality of mouth attaching elements disposed around a perimeter of said mouth, wherein said mouth is openable and closeable;

b. providing a strap, wherein said strap includes a first end, a second end, a first attachment arrangement, a second attachment arrangement, and a strap portion, wherein said first attachment arrangement is attached to said strap towards said first end, wherein said first attachment arrangement includes a releasable connecting member, wherein said second attachment arrangement is attached to said strap towards said second end, wherein said second attachment arrangement includes an opening; and c. inserting said strap through said plurality of mouth attaching elements, and through said opening in said second attachment arrangement, wherein said second end, said second attachment arrangement, and said strap portion are located adjacent said mouth when tension in said strap causes said mouth to close, wherein said strap portion extends from said second end, through said plurality of mouth attaching elements, and to said opening in said second attachment arrangement where said strap passes there through.

2. The method as recited in claim 1, wherein said strap is elasticated.

3. The method as recited in claim 2, further comprising filling said mesh body with the hay and connecting said elasticated strap to the support structure at a height wherein weight of said hay-filled mesh body provides a tension in said elasticated strap and stretches said elasticated strap, wherein said tension causes said mouth to close, wherein when the hay is removed from said mesh body by the feeding of livestock reduction of said tension in said stretched elasticated strap acts to lift said mesh body.

4. The method as recited in claim 1, further comprising connecting said releaseable connecting member to said securing member.

5. The method as recited in claim 1, further comprising inserting said releasable connecting member through said securing member opening, and further comprising connecting said releaseable connecting member to one from the group consisting of said second attachment arrangement, said second end, said strap portion, and one of said plurality of mouth attaching elements.

6. The method as recited in claim 1, wherein said second attachment arrangement includes a strap ring, wherein said strap ring provides said second attachment arrangement opening, wherein said inserting said strap through said opening in said second attachment arrangement includes inserting said strap through said strap ring.

7. The method as recited in claim 1, wherein said securing member includes a securing member ring wherein said securing member ring provides said securing member opening.

8. The method as recited in claim 7, wherein said releaseable connecting member includes a clip.

9. The method as recited in claim 8, wherein said clip includes a first portion and a second portion, wherein said connecting said strap to said securing member includes connecting said clip to said securing member, wherein said connecting said clip to said securing member includes inserting said first portion through said securing member ring while said second portion extends outside said securing member ring, wherein said first portion contacts said second portion.

10. The method as recited in claim 8, wherein said clip is sized to fit through said securing member ring, further comprising inserting said clip and said first end of said strap through said securing member ring, and further comprising connecting said clip to one from the group consisting of said second attachment arrangement, said second end, said strap portion, and one of said plurality of mouth attaching elements.

11. The method as recited in claim 1, wherein said plurality of mouth attaching elements includes a plurality of loops, wherein each of said plurality of loops is connected to said mouth and is sized to allow said strap to be inserted there through.

12. The method as recited in claim 11, wherein said second attachment arrangement has a dimension, wherein said dimension is larger than at least one of said plurality of loops, wherein said dimension prevents said second attachment arrangement from passing through said at least one loop.

13. The method as recited in claim 1, further comprising:
a. filling said mesh body with hay;
b. connecting said strap to the support structure at a height wherein weight of said hay-filled mesh body provides a tension in said elasticated strap and stretches said elasticated strap, wherein said tension causes said mouth to close;
c. connecting said releasable connecting member to said securing member or through said securing member opening, wherein if said releaseable connecting member is connected through said securing member opening, connecting said releaseable connecting member to one from the group consisting of said second attachment arrangement, said second end, said strap portion, and one of said plurality of mouth attaching elements; and
d. feeding the livestock.

14. The method as recited in claim 13, further comprising releasing said releasable connecting member after said feeding.

15. A method of feeding hay to livestock with a hay net device that may be connected to a support structure, comprising:
a. providing a mesh body, wherein said mesh body includes a plurality of strands, a mouth, and a securing member ring, wherein said mesh body is configured as a bag, wherein said strands are connected to one another with apertures there between, wherein said apertures are sized for retaining the hay in said mesh body while permitting the livestock to remove the hay, wherein said securing member is located at a first position of said mesh body, wherein said mouth is located at a second position of said mesh body, wherein said first position is spaced from said second position, wherein said mouth includes a plurality of mouth attaching elements disposed around a perimeter of said mouth, wherein said mouth is openable and closeable;
b. providing an elasticated strap, wherein said elasticated strap includes a first end, a second end, a strap clip, a strap ring, and a strap portion, wherein said strap clip is attached to said elasticated strap towards said first end, wherein said strap ring is attached to said elasticated strap towards said second end, wherein said strap ring has a strap ring opening; and
c. inserting said elasticated strap through said plurality of mouth attaching elements, and inserting said strap clip through said strap ring opening, wherein said second end, said strap ring, and said strap portion are located adjacent said mouth when tension in said strap causes said mouth to close, wherein said strap portion extends from said second end, through said plurality of mouth attaching elements, and to said opening in said strap ring where said strap passes there through.

16. The method as recited in claim 15, further comprising connecting said strap clip to said securing member ring.

17. The method as recited in claim 15, wherein said strap clip is sized to fit through said securing member ring, further comprising inserting said strap clip and said first end of said elasticated strap through said securing member ring and connecting said strap clip to one from the group consisting of said second end, said strap ring, said strap portion, and one of said plurality of mouth attaching elements.

18. A hay net device that may be connected to a support structure for feeding hay to livestock, comprising:
a mesh body, wherein said mesh body includes a plurality of strands, a mouth, and a securing member, wherein said mesh body is configured as a bag, wherein said strands are connected to one another with apertures there between, wherein said apertures are sized for retaining the hay in said mesh body while permitting the livestock to remove the hay, wherein said securing member is located at a first position of said mesh body, wherein said mouth is located at a second position of said mesh body, wherein said first position is spaced from said second position, wherein said securing member includes a securing member opening, wherein said mouth includes a plurality of mouth attaching elements disposed around a perimeter of said mouth, wherein said mouth is openable and closeable; and
a strap, wherein said strap includes a first end, a second end, a first attachment arrangement, a second attachment arrangement, and a strap portion, wherein said first attachment arrangement is attached to said strap towards said first end, wherein said first attachment arrangement includes a releasable connecting member, wherein said second attachment arrangement is attached to said strap towards said second end, wherein said second attachment arrangement includes an opening, wherein said strap extends, in order, from said second attachment arrangement, through said plurality of mouth attaching elements, and through said opening in said second attachment arrangement, wherein said second end, said second attachment arrangement, and said strap portion are located adjacent said mouth when tension in said strap causes said mouth to close, wherein said strap portion extends from said second end, through said plurality of mouth attaching elements, and to said opening in said second attachment arrangement where said strap passes there through.

19. The hay net device as recited in claim 18, wherein said strap is elasticated.

20. The hay net device as recited in claim 18, wherein said securing member includes a securing member ring wherein said securing member ring provides said securing member opening.

21. The hay net device as recited in claim 20, wherein said releaseable connecting member includes a clip.

22. The hay net device as recited in claim 18, wherein said plurality of mouth attaching elements includes a plurality of loops, wherein each of said plurality of loops is connected to said mouth and is sized to allow said strap to be inserted there through.

23. The hay net device as recited in claim 22, wherein said second attachment arrangement has a dimension, wherein said dimension is larger than at least one of said plurality of loops, wherein said dimension prevents said second attachment arrangement from passing through said at least one loop.

* * * * *